(12) United States Patent
Yoo et al.

(10) Patent No.: US 6,618,110 B2
(45) Date of Patent: Sep. 9, 2003

(54) LIQUID CRYSTAL DISPLAY AND FABRICATING METHOD THEREOF

(75) Inventors: Soon Sung Yoo, Kyoungsangbuk-do (KR); Dong Yeung Kwak, Taegu (KR); Hu Sung Kim, Seoul (KR); Yong Wan Kim, Kyoungsangbuk-do (KR); Dug Jin Park, Taegu (KR); Yu Ho Jung, Kyoungsangbuk-do (KR); Woo Chae Lee, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/923,324

(22) Filed: Aug. 8, 2001

(65) Prior Publication Data
US 2002/0021381 A1 Feb. 21, 2002

(30) Foreign Application Priority Data
Aug. 8, 2000 (KR) ........................................ 2000-45944

(51) Int. Cl.$^7$ ............................................. G02F 1/1343
(52) U.S. Cl. ........................................................ 349/141
(58) Field of Search ................................ 349/42, 46, 58, 349/141, 111

(56) References Cited

U.S. PATENT DOCUMENTS

| 6,266,117 | B1 | * | 7/2001 | Yanagawa | 349/141 |
| 6,278,504 | B1 | * | 8/2001 | Sung | 349/46 |
| 6,504,587 | B1 | * | 1/2003 | Shunsuke | 349/58 |

* cited by examiner

Primary Examiner—John F. Niebling
Assistant Examiner—Andre C Stevenson
(74) Attorney, Agent, or Firm—Morgan, Lewis & Bockius LLP

(57) ABSTRACT

A liquid crystal display device includes a transparent substrate, a gate electrode disposed on the transparent substrate, a gate insulating film disposed on the transparent substrate and covering the gate electrode, an active layer disposed on the gate insulating film, an ohmic contact layer disposed on the active layer, a source electrode disposed on the ohmic contact layer and at one side of the gate electrode, a drain electrode disposed on the ohmic contact layer and at another side of the gate electrode, the drain electrode including an L-shaped portion and a plurality of protrusions, a protective layer disposed on the active layer covering upper surfaces of the source electrode and the drain electrode, and a pixel electrode disposed on the protective layer and electrically contacting a side surface of the drain electrode.

10 Claims, 9 Drawing Sheets

LIQUID CRYSTAL DISPLAY AND FABRICATING METHOD THEREOF

The present invention claims the benefit of Korean Patent Application No. P2000-45944 filed on Aug. 8, 2000 in Korea, which is hereby incorporated by reference.

BACKGROUND OF THE INVENTION

1. Field of the Invention

This invention relates to a liquid crystal display, and more particularly to a liquid crystal display and a fabricating method thereof.

2. Description of the Related Art

Generally, a liquid crystal display (LCD) controls light transmissivities of liquid crystal cells in response to video signals. An active matrix LCD provided with a switching device for each liquid crystal cell is suitable for displaying moving images. A thin film transistor (TFT) is used as a switching device in the active matrix LCD.

FIG. 1 is a plan view showing a structure of a conventional LCD, and FIG. 2 is a cross-sectional view of the conventional LCD along A–A' in FIG. 1.

In FIGS. 1 and 2, the conventional LCD includes a TFT having a gate electrode 13, agate insulating film 15 and an active layer 17 disposed on a substrate 11. The LCD also includes a source electrode 21 and a drain electrode 23 on the active layer 17, and a pixel electrode 29 that is electrically connected to the drain electrode 23 via a contact hole 27. The TFT applies a data signal from a data line 24 to a pixel electrode 29 during a period in which a scanning pulse is applied to the gate electrode 13. The gate electrode 13 is electrically connected to the gate line 14 while the source electrode 21 is electrically connected to the data line 24. The drain electrode 23 is electrically connected to the pixel electrode 29 via a contact hole 27 formed in a protective layer 25. The pixel electrode may be formed of a conductive material such as indium-tin-oxide (ITO), indium-zinc-oxide (IZO) or indium-tin-zinc-oxide (ITZO). The gate insulating film 15 may be formed of an inorganic insulating material and the source electrode 21, the data line 24, and the active layer 17 may be formed on the gate insulating film 15. The protective layer 25 may be made from an inorganic insulating material or an organic material.

FIGS. 3A to 3E show a process of fabricating the conventional LCD shown in FIG. 1 and in particular shows the TFT portion of the LCD.

In FIG. 3A, aluminum (Al) or a copper (Cu) is deposited on a transparent substrate 11 by a sputtering process, for example, to form a metallic thin film. The metallic thin film is patterned by photolithographic and wet etching processes, thereby forming the gate electrode 13.

In FIG. 3B, a gate insulating film 15 is formed on the transparent substrate 11 to cover the gate electrode 13. The gate insulating film 15 is formed by deposition of an insulation material such as silicon oxide or silicon nitride. An active layer 17 and an ohmic contact layer 19 are sequentially formed on the gate insulating film 15 by a chemical vapor deposition (CVD) process, wherein the active layer 17 is formed from an amorphous silicon or a polycrystalline silicon that is not doped with an impurity. The ohmic contact layer 19 is made from an amorphous silicon or polycrystalline silicon doped with an n-type or p-type impurity at a high concentration The ohmic contact layer 19 and the active layer 17 are patterned by photolithographic and anisotropic etching processes, thereby exposing the gate insulating film 15. Portions of the active layer 17 and the ohmic contact layer 19 remain only at a portion corresponding to the gate electrode 13.

In FIG. 3C, molybdenum (Mo) or a molybdenum alloy such as molybdenum-tungsten (MoW), molybdenum tantalum (MoTa) or molybdenum-niobium (MoNb), is deposited on the gate insulating film 15 by a CVD or sputtering process to cover the ohmic contact layer 19. The metal or the metal alloy deposited in this manner makes ohmic contact to the ohmic contact layer 19. Then, the metal or the metal alloy is patterned, along with the ohmic contact layer 19, by photolithographic and etching processes, thereby exposing a portion of the active layer directly above the gate electrode 13 and forming the source electrode 21 and the drain electrode 23.

In FIG. 3D, an inorganic insulating material such as silicon nitride or silicon oxide, or an organic insulation material having a small dielectric constant such as an acrylic organic compound, Teflon, BCB (benzocyclobutane), Cytop or PFCB (perfluorocyclobutane), is deposited on the gate insulating layer 15, thereby forming a protective layer 25. Then, a contact hole 27 is formed in the protective layer 25 exposing the drain electrode 23.

In FIG. 3E, a transparent conductive material such as ITO, IZO or ITZO is deposited onto the protective layer 25 and into the contact hole 27, thereby forming the pixel electrode 29. The pixel electrode 29 electrically contacts with the drain electrode 23 via the contact hole 27.

However, in the conventional LCD, since the contact hole must be formed in the protective layer to electrically connect the drain electrode to the pixel electrode, an aperture ratio is reduced and a complicated process is required.

SUMMARY OF THE INVENTION

Accordingly, the present invention is directed to a liquid crystal display and fabricating method thereof that substantially obviate one or more of the problems due to limitations and disadvantages of the related art.

An object of the present invention to provide a liquid crystal display and a fabricating method thereof wherein a drain electrode and a pixel electrode are connected to each other without any contact hole, thereby increasing an aperture ratio.

Additional features and advantages of the invention will be set forth in the description which follows, and in part will be apparent from the description, or may learned by practice of the invention. The objective and other advantages of the invention will be realized and attained by the structure and method particularly pointed out in the written description and claims hereof as well as the appended drawings.

To achieve these and other advantages and in accordance with the purpose of the present invention, as embodied and broadly described a liquid crystal display device includes a transparent substrate, a gate electrode disposed on the transparent substrate, a gate insulating film disposed on the transparent substrate and covering the gate electrode, an active layer disposed on the gate insulating film an ohmic contact layer disposed on the active layer, a source electrode disposed on the ohmic contact layer and at one side of the gate electrode, a drain electrode disposed on the ohmic contact layer and at another side of the gate electrode, the drain electrode including an L-shaped portion and a plurality of protrusions, a protective layer disposed on the active layer covering upper surfaces of the source electrode and the drain electrode, and a pixel electrode disposed on the protective layer and electrically contacting a side surface of the drain electrode.

In another aspect, a method of fabricating a liquid crystal display device includes the steps of forming a gate electrode on a transparent substrate, forming a gate insulating film, an active layer and an ohmic contact layer on the transparent substrate to cover the gate electrode, forming a source electrode and a drain electrode on the ohmic contact layer and patterning the drain electrode to form an L-shaped portion and a plurality of protrusions, forming a protective layer on the source and drain electrodes such that side surfaces of the protective layer, the drain electrode, the ohmic contact layer and the active layer are exposed, and forming a pixel electrode on the protective layer to electrically contact the side surface of the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
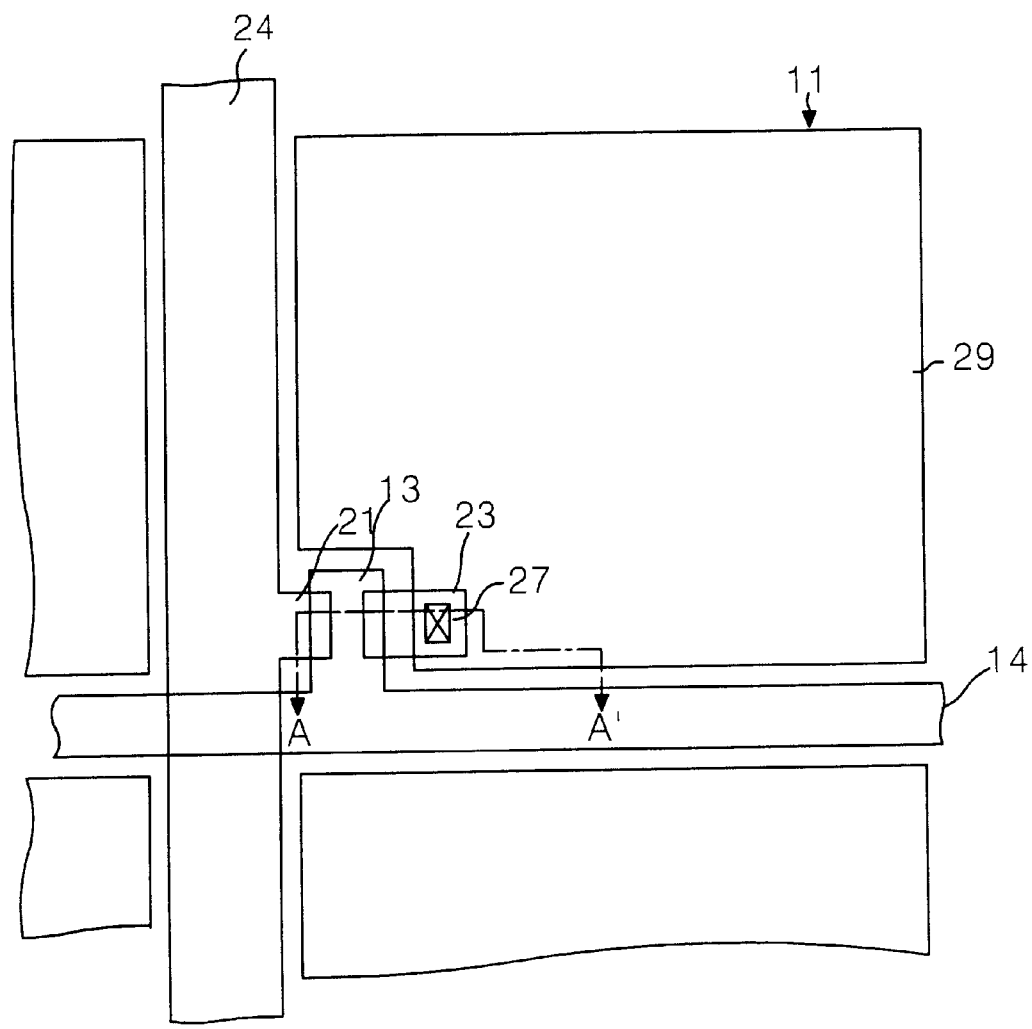
FIG. 1 is a plan view showing a conventional liquid crystal display device.
Figure 2:
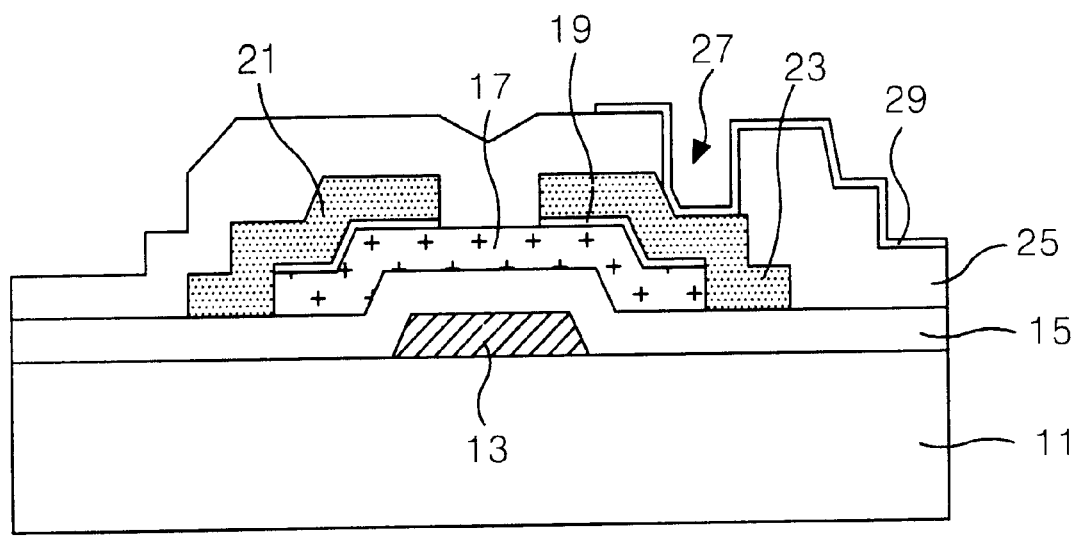
FIG. 2 is a cross-sectional view of the conventional liquid crystal display device of FIG. 1 along the line A–A'.
Figure 3A:
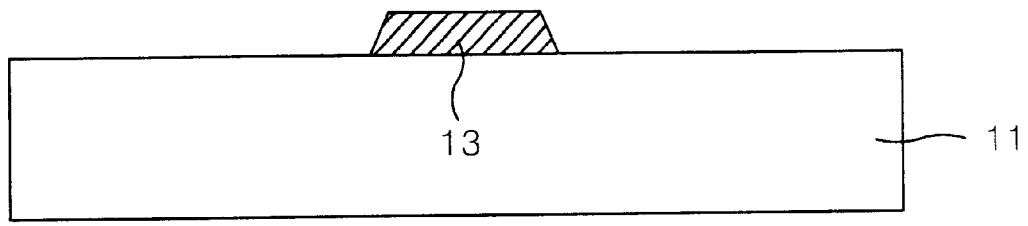
FIGS. 3A to 3E are cross-sectional views showing a conventional method of fabricating the liquid crystal display device shown in FIG.
Figure 3B:
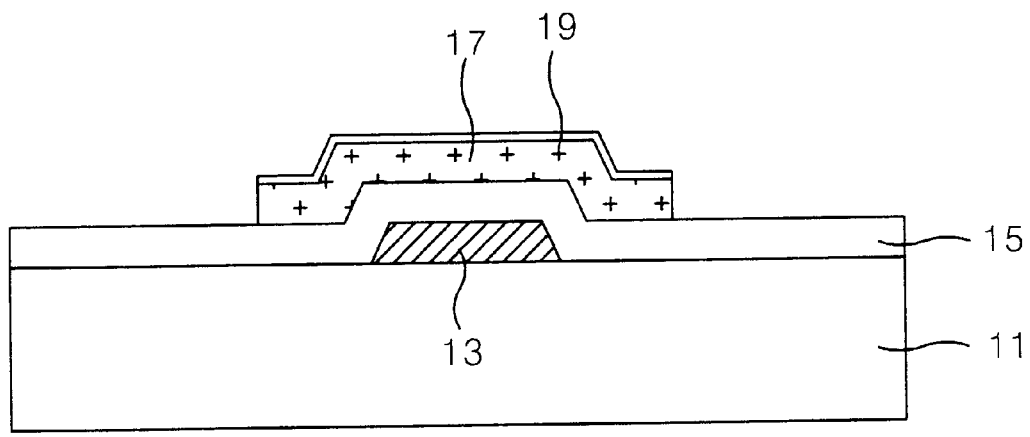
Figure 3C:
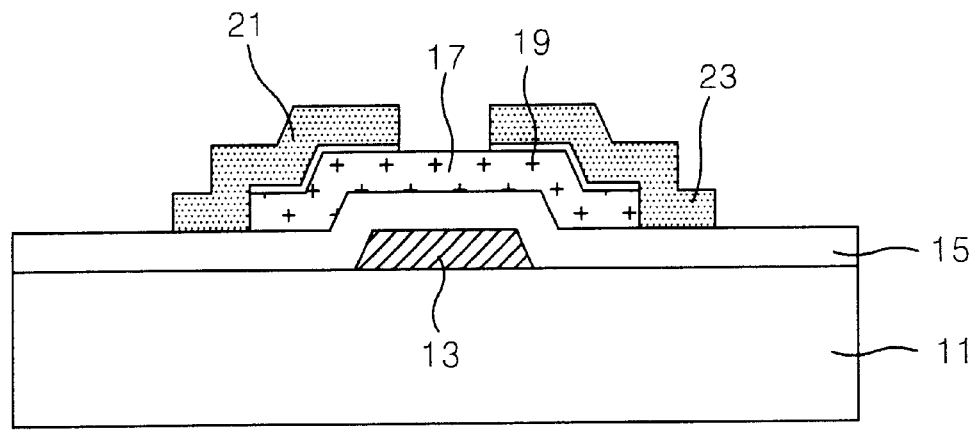
Figure 3D:
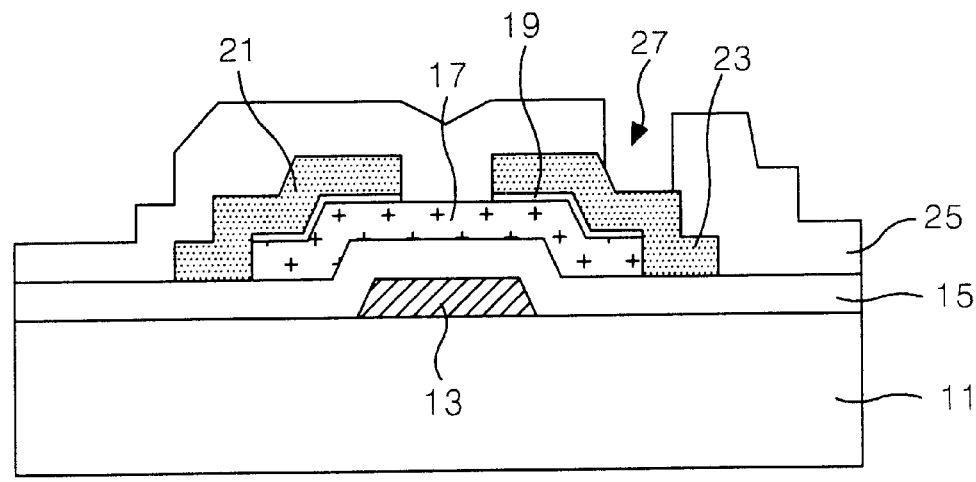
Figure 3E:
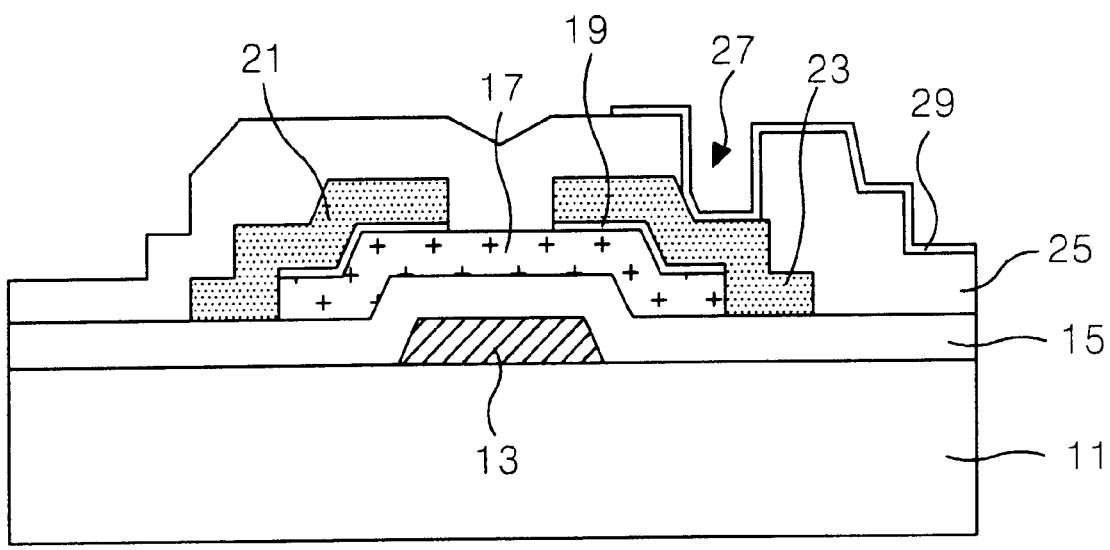
Figure 4:
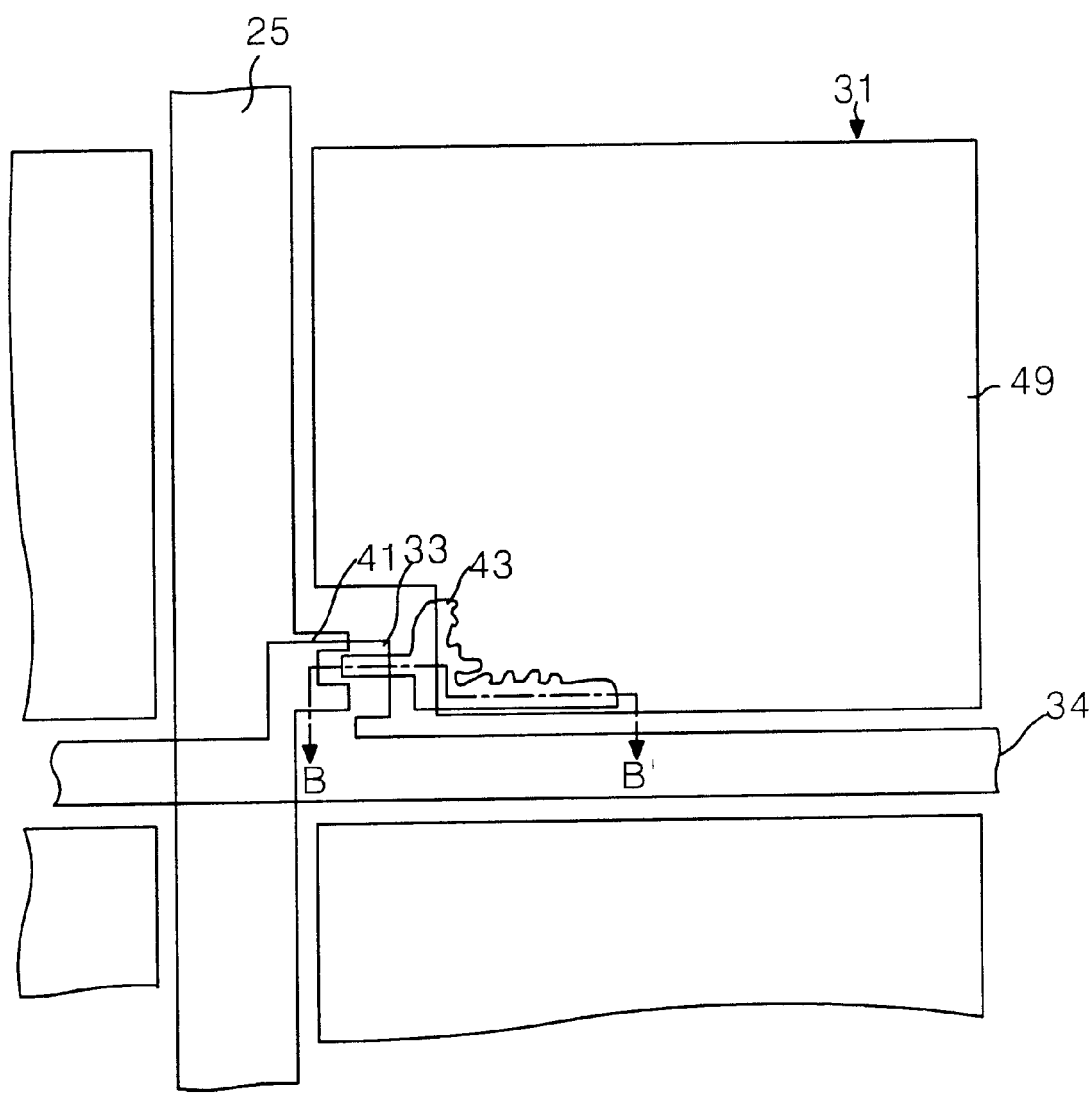
FIG. 4 is a plan view showing a liquid crystal display device according to the present invention.
Figure 5:
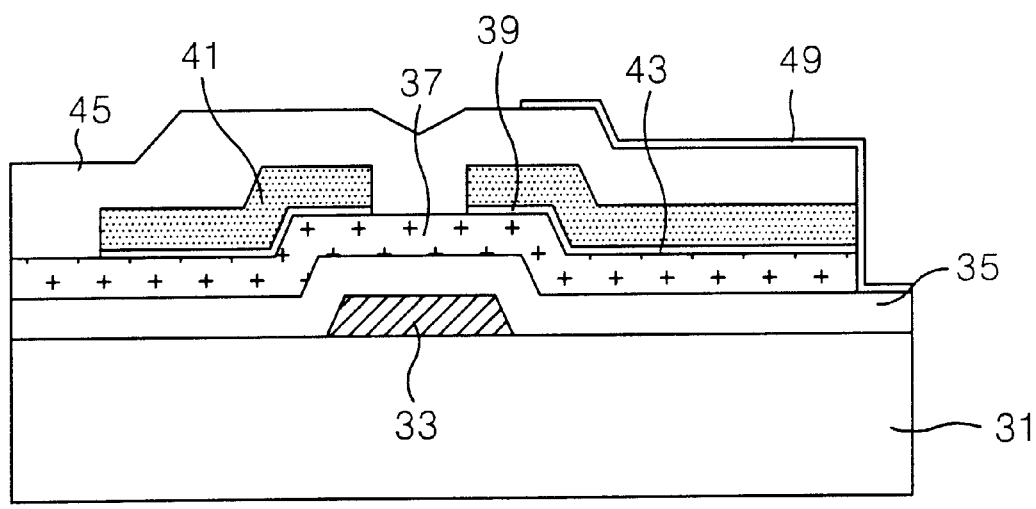
FIG. 5 is a cross-sectional view of the liquid crystal display device of FIG. 4 along the line B–B'.

In FIGS. 4 and 5, a liquid crystal display device according to the present invention includes a gate electrode 33 formed on a transparent substrate 31. The gate electrode 33 may be formed of a metal such as aluminum (Al) or copper (Cu) to be electrically connected to a gate line 34. A gate insulating film 35 may be formed on the transparent substrate 31 covering the gate electrode 33 and the gate line 34. The gate insulating film 35 may be made from silicon nitride or silicon oxide, for example.

Next, amorphous silicon or polycrystalline silicon not doped with an impurity may be deposited onto a portion of the gate insulating film 35 that corresponds to the gate electrode 33, thereby forming an active layer 37. Ohmic contact layers 39 may be formed on opposing sides of the active layer 37, and a source electrode 41 and a drain electrode 43 may be formed on respective ones of the ohmic contact layers 39. The ohmic contact layers 39 may be made from amorphous silicon or polycrystalline silicon doped with a n-type or p-type impurity at a high concentration. The source electrode 41 and the drain electrode 43 may be made from a metal such as molybdenum (Mo), chromium (Cr), titanium (Ti) or tantalum (Ta), or from a molybdenum alloy such as molybdenum-tungsten (MoW), molybdenum-tantalum (MoTa), or molybdenum-niobium (MoNb).

The source electrode 41 may be electrically connected to a data line 44, and the drain electrode 43 may be formed on the active layer 37 opposed to the source electrode 41. The source electrode 41 maybe formed into a "U" shape or an "L" shape so that a channel can be easily formed between the source electrode 41 and the drain electrode 43, and a portion of the drain electrode 43 is surrounded by the source electrode 41 at three sides. The drain electrode 43 is formed in an "L" shape and has a plurality of protrusions at a portion that overlaps with the pixel electrode 49, wherein a side surface of the drain electrode 43 electrically contacts the pixel electrode 49. The ohmic contact layer 39 and the active layer 37 remain beneath the drain electrode 43.

A thin film transistor includes the gate electrode 33, the gate insulating film 35, the active layer 37 and the source and drain electrodes 41 and 43 as described above. A protective layer 45 which may be made from an inorganic insulating material such as silicon nitride or silicon oxide, for example, is formed on the active layer 37 covering the thin film transistor and in particular, each side surface of the source and drain electrodes 41 and 43.

A pixel electrode 49 may be made from a transparent conductive material such as ITO, TO or ITZO, for example, and may be disposed on an exposed area of the gate insulating film 35 and on the protective layer 45 above a portion corresponding to the drain electrode 43. The pixel electrode 49 electrically contacts the side surface of the drain electrode 43 patterned into a "L" shape. Accordingly, the pixel electrode 49 is in electrical contact with the drain electrode 43 without any contact hole, thereby increasing an aperture ratio.

FIGS. 6A to 6D show EL process of fabricating the liquid crystal display device in FIG. 4.

Figure 6A:
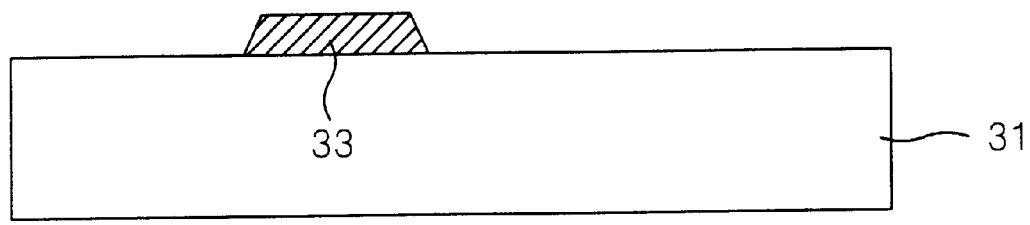
FIGS. 6A to 6D are cross-sectional views showing a method of fabricating the liquid crystal display device shown in FIG. 5.

In FIG. 6A, aluminum (Al) or copper (Cu) may be deposited on a transparent substrate 31 by a sputtering process, for example, or a metal thin film may be formed thereon by an electroless plating process. Then, the metal thin film may be patterned by photolithographic and wet etching processes to form the gate electrode 33 on the transparent substrate 31. Glass, quartz or a transparent plastic, for example, may be used as the transparent substrate 31.

Figure 6B:
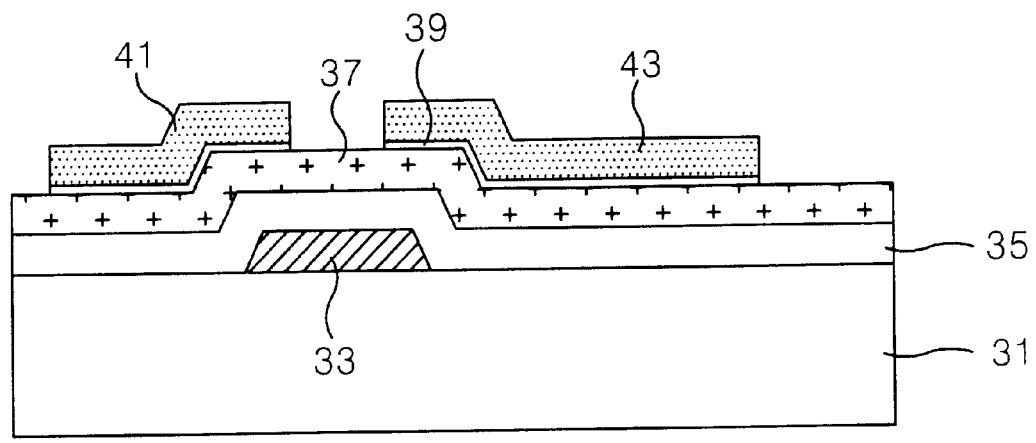

In FIG. 6B, the gate insulating film 35, the active layer 37 and the ohmic contact layer 39 may be sequentially formed on the transparent substrate 31 by a chemical vapor deposition (CVD) process to cover the gate electrode 33. The gate insulating film 35 may be formed from an insulation material such as silicon oxide or silicon nitride, for example, and the active layer 37 may be formed from amorphous silicon or polycrystalline silicon being not doped with an impurity. The ohmic contact layer 39 may be formed from amorphous silicon or polycrystalline silicon doped with an n-type or p-type impurity at a high concentration.

A metal such as molybdenum (Mo), chromium (Cr), titanium (Ti) or tantalum (Ta), or a molybdenum alloy such as MoW, MoTa or MoNb may be deposited on the ohmic contact layer 39 by a CVD or sputtering process to form a metal thin film. Then, the metal thin film may be patterned by photolithographic and wet etching processes to form the source electrode 41 and the drain electrode 43. Thereafter, the exposed ohmic contact layer 39 may be dry-etched to expose portions of the active layer 37. An exposed portion of the active layer 37 corresponds to the gate electrode 33 disposed between the source and drain electrodes 41 and 43, thereby forming a channel region of the active layer 37. The source and drain electrodes 41 and 43 make ohmic contact with the ohmic contact layer 39.

Figure 6C:
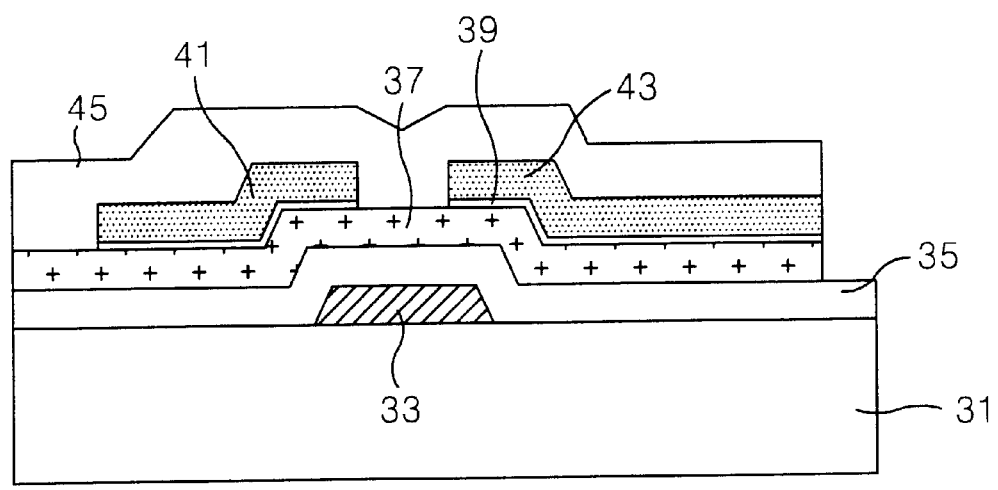

In FIG. 6C, an inorganic insulating material such as silicon oxide or silicon nitride, for example, may be deposited on the active layer 39 to cover the source and drain electrodes 41 and 43, thereby forming the protective layer 45. The protective layer 45 and the active layer 37 may be patterned by a photolithographic process to expose a portion of the gate insulating film 35. In this case, a portion of the drain electrode 43 that is opposite to the source electrode 41 may be formed into an "L" shape and have a plurality of protrusions extending from a side thereof, thereby forming the drain electrode 43. The protective layer 45 may be formed at an upper portion of the drain electrode 43, and the ohmic contact layer 41 and the active layer 39 remain at a lower portion of the drain electrode 43 such that the side surface of the drain electrode 43 may be exposed.

Figure 6D:
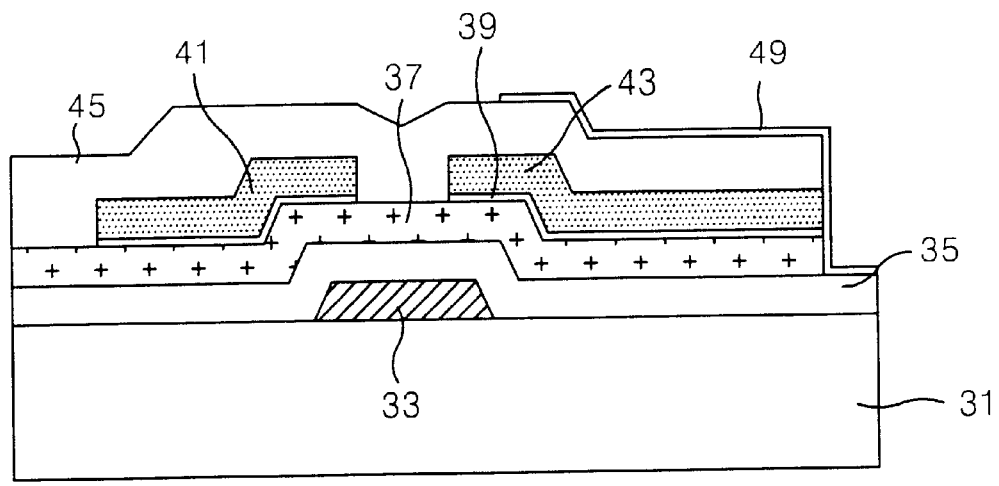

In FIG. 6D, a transparent conductive material such as indium-tin-oxide (ITO), tin-oxide (TO), indium-zinc-oxide (IZO), or indium-tin-zinc-oxide (ITZO), for example, may be deposited on the gate insulating film 35 to cover the protective layer 45. Thereafter, the transparent conductive material may be patterned by photolithographic and wet etching processes, thereby forming the pixel electrode 49. The pixel electrode 49 contacts the side surface of the "L"-shaped drain electrode 43, including the at least one protrusion to be electrically connected to the drain electrode 43. Furthermore, the pixel electrode 49 electrically contacts side surfaces of the ohmic contact layer 39 and the active layer 37.

As described above, according to the present invention, the side surface of the drain electrode takes an "L" shape. The side of the drain electrode has protrusions that are in electrical contact with the pixel electrode, thereby enlarging an area contacting the pixel electrode. Accordingly, a contact resistance between the drain electrode and the pixel electrode is reduced so that a signal received from the drain electrode into the pixel electrode is efficiently transmitted.

It will be apparent to those skilled in the art that various modifications and variations can be made in the liquid crystal display and method of fabricating a liquid crystal display of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
   a transparent substrate;
   a gate electrode disposed on the transparent substrate;
   a gate insulating film disposed on the transparent substrate and covering the gate electrode;
   an active layer disposed on the gate insulating film;
   an ohmic contact layer disposed on the active layer;
   a source electrode disposed on the ohmic contact layer and at one side of the gate electrode;
   a drain electrode disposed on the ohmic contact layer and at another side of the gate electrode, the drain electrode including an L-shaped portion and a plurality of protrusions;
   a protective layer disposed on the active layer covering upper surfaces of the source electrode and the drain electrode; and
   a pixel electrode disposed on the protective layer and electrically contacting a side surface of the drain electrode.

2. The liquid crystal display device according to claim 1, wherein the source electrode is U-shaped.

3. The liquid crystal display device according to claim 2, wherein the source electrode surrounds a portion of the drain electrode at three sides.

4. The liquid crystal display device according to claim 1, wherein the plurality of protrusions overlap the pixel electrode.

5. The liquid crystal display device according to claim 1, wherein the pixel electrode is disposed on the gate insulating film.

6. The liquid crystal display device according to claim 1, wherein the pixel electrode electrically contacts side surfaces of the ohmic contact layer and the active layer.

7. The liquid crystal display device according to claim 6, wherein the electrical contacts of the pixel electrode with the side surfaces of the drain electrode, ohmic contact layer, and active layer are along a plane.

8. The liquid crystal display device according to claim 1, wherein the ohmic contact layer includes one of amorphous silicon and polycrystalline silicon.

9. The liquid crystal display device according to claim 1, wherein the pixel electrode includes one of indium-tin-oxide (ITO), tin-oxide (TO), indium-zinc-oxide (ITO), and indium-tin-zinc-oxide (ITZO).

10. The liquid crystal display device according to claim 1, wherein the protective layer covers side surfaces of the source electrode and the drain electrode.

* * * * *